April 19, 1949.  D. FIRTH  2,467,819
MOUNTING FOR SHEAVES, ETC
Filed Dec. 30, 1944  3 Sheets-Sheet 1
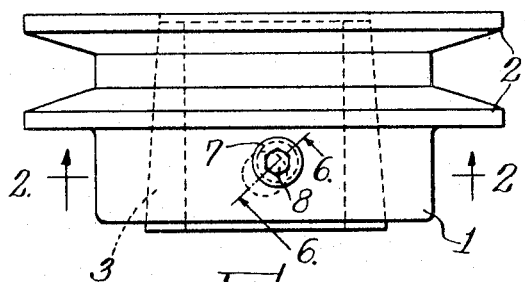
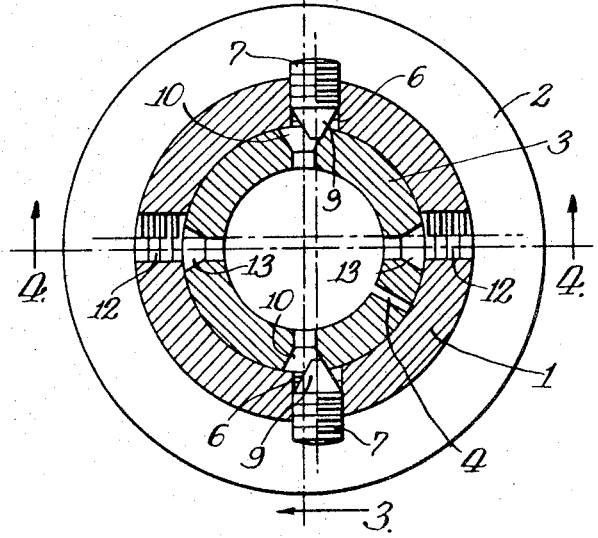
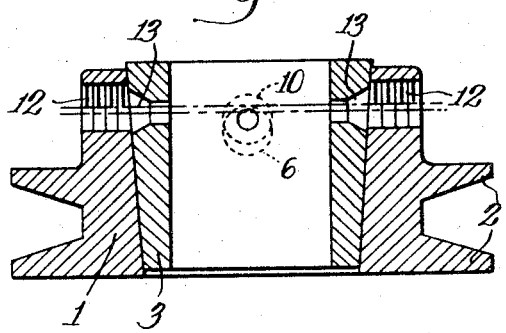
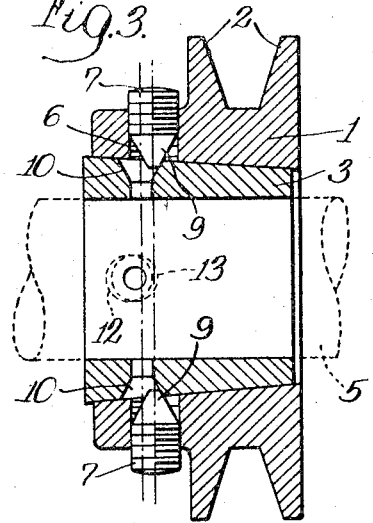
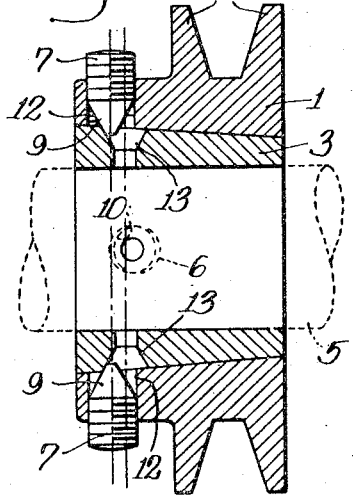
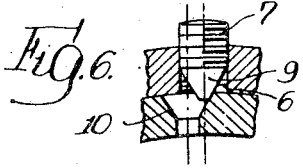
INVENTOR.
David Firth
BY
Osgood H. Dowell
Atty.

April 19, 1949.   D. FIRTH   2,467,819
MOUNTING FOR SHEAVES, ETC
Filed Dec. 30, 1944   3 Sheets-Sheet 2
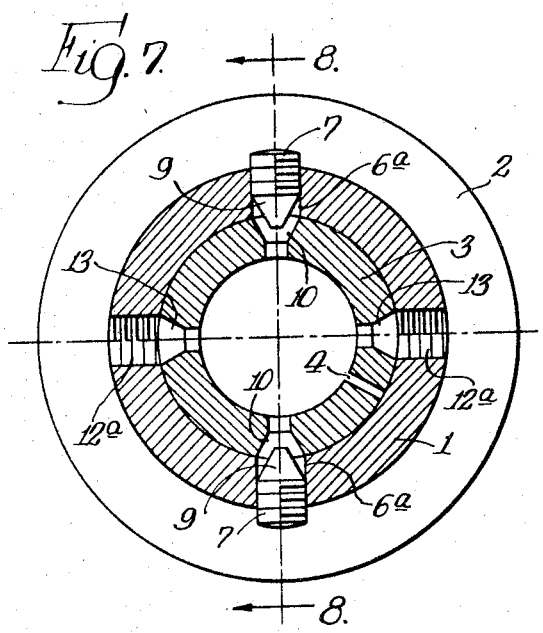
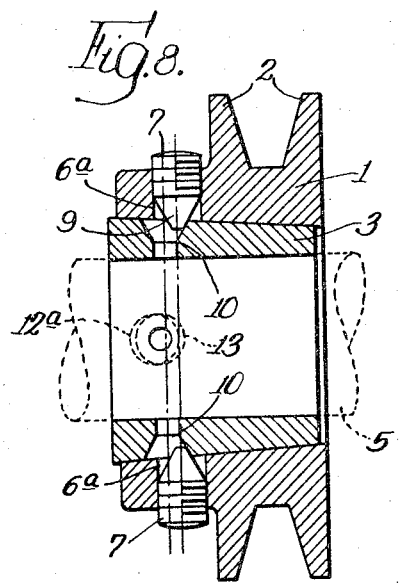
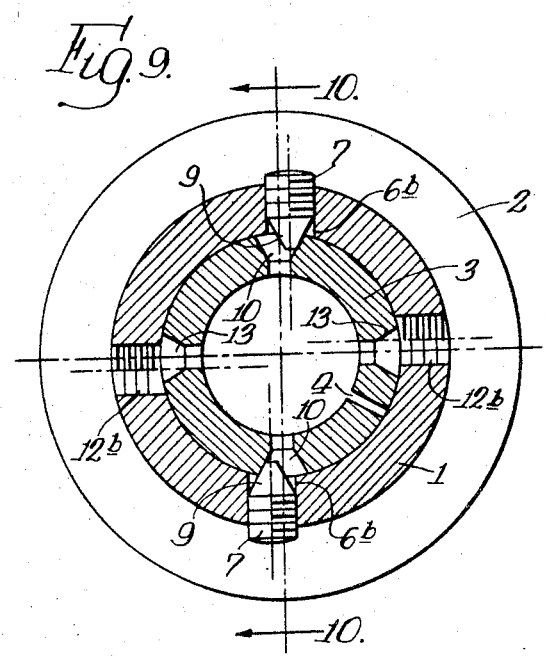
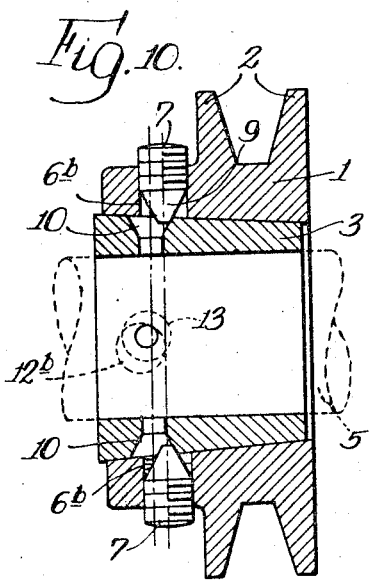
INVENTOR.
David Firth,
BY
Osgood H. Wowell
Atty.

April 19, 1949. D. FIRTH 2,467,819
MOUNTING FOR SHEAVES, ETC
Filed Dec. 30, 1944 3 Sheets-Sheet 3
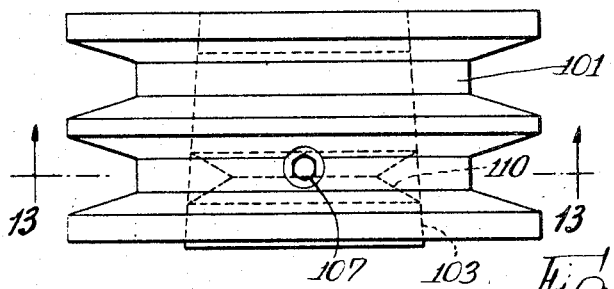
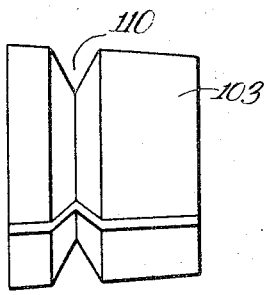
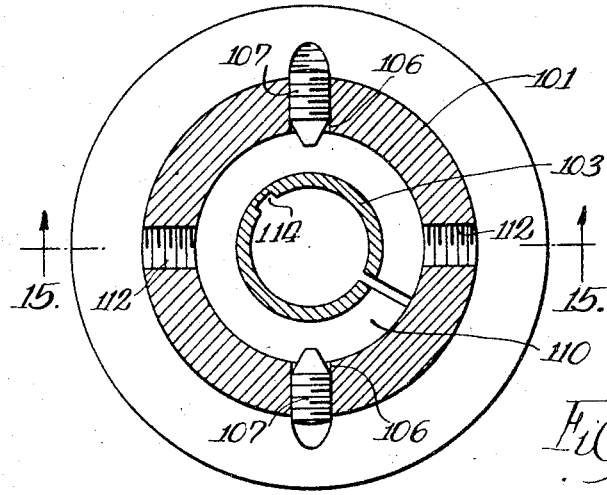
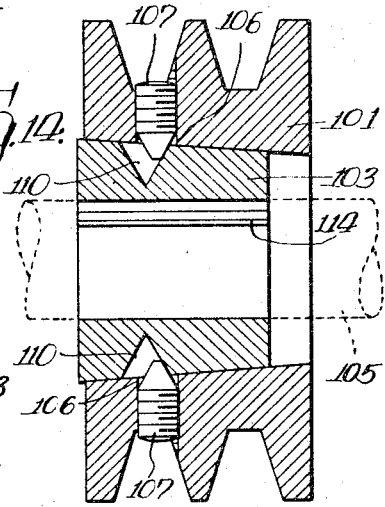
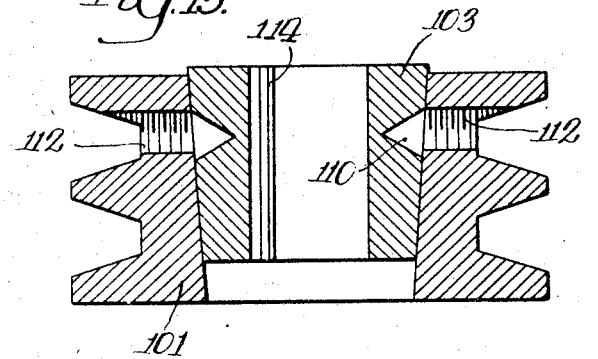
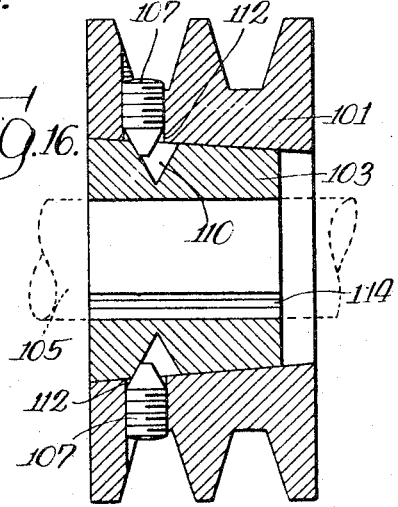
INVENTOR.
David Firth,
BY
Osgood H. Wowell
Atty.

Patented Apr. 19, 1949

2,467,819

UNITED STATES PATENT OFFICE 2,467,819

MOUNTING FOR SHEAVES, ETC.

David Firth, South Bend, Ind., assignor to Dodge Manufacturing Corporation, Mishawaka, Ind., a corporation of Indiana Application December 30, 1944, Serial No. 570,569

15 Claims. (Cl. 287—52)

This invention relates to the mounting on shafts of sheaves or pulleys and other machine elements.

An object of the invention is to provide a sheave, sprocket or other machine element with a practicable and simple mounting means comprising a tapered split contractible bushing fitting a tapered bore in the hub of such machine element and screws for forcing the hub and bushing to axial relationship to wedge the bushing between the hub and the shaft to which it is applied; the construction and arrangement with respect to the screws and their operative connections being such as to permit the use of a flangeless bushing in an ordinary simple taper-bored hub and to minimize or nearly to minimize dimensional requirements for accommodation of the screws. Another object is to provide such a mounting means in which such screws or others can be utilized in a consistent arrangement for dewedging the bushing or effecting release thereof from gripping engagement with the hub and shaft, so that the shaft-mountable unit comprising such sheave, sprocket or other machine element equipped with such mounting means can be not only easily installed on its shaft but also easily and quickly demounted.

Objects and advantages of the invention more or less ancillary or subsidiary to those above indicated will be understood from the following description with reference to the accompanying drawings, in which there is shown for illustration in Figs. 1 to 6 a shaft-mountable unit comprising a sheave having mounting means embodying the invention in one practicable form, including certain subsidiary features of advantage; while additional figures show other such units embodying the invention or its fundamental features in other practicable forms.

Preliminarily to the description of the drawings, it may be observed that a structure embodying the invention is characterized by transversely disposed screws, preferably arranged radially or parallel to radial lines, threaded in the hub and coacting with the bushing by engagement of their inner ends with inclined surfaces formed in and by recessed portions of the bushing. In the illustrative structure of Figs. 1 to 6, and also that of Figs. 9 and 10, the screws are eccentric to conical bushing holes in which the screws coact with the bushing, the centers of the screws and holes therefor in the hub being offset two ways or both longitudinally and laterally relative to the radial lines of centers of the corresponding bushing holes. Because of this specific relation of the screw holes and bushing holes in said structures of Figs. 1 to 6 and Figs. 9 to 10, it is expedient for illustration to show transverse and longitudinal sections of said structures taken through centers of bushing holes but representing the screws and screw holes as if they were centered in the planes of said sections instead of the adjacent planes in which they are actually centered. Figs. 2 to 5 and 9 and 10 are views of this character, analogous to sections taken on staggered section lines or in different parallel planes.

In said drawings:

Fig. 1, being a top plan view of Fig. 2, shows in elevation the unit otherwise shown in Figs. 2 to 6.

Fig. 2 is a cross section of said unit taken on the line 2—2 of Fig. 1, looking in the direction of the arrows, but showing the screws in elevation as if they were centered in the plane of said section, though actually the centers of said screws are offset forwardly from said plane as shown in Figs. 1 and 3.

Fig. 3 is a longitudinal section of said unit taken on the line 3—3 of Fig. 2, looking in the direction of the arrows, but showing the screws as if centered in the plane of such section, whereas their centers are offset laterally from said plane as shown by Figs. 1 and 2.

Fig. 4 is a horizontal section on the line 4—4 of Fig. 2, looking in the direction of the arrows, the extra screw holes 12 being shown as if centered in the plane of the section though their centers are offset laterally therefrom as shown in Fig. 2.

Fig. 5 is a longitudinal section of said unit with the bushing in the position in which it is wedged between the hub and shaft and the screws rearranged in the supplemental screw holes 12 for retracting the bushing to release it from gripping engagement with the hub and shaft, the section being at right angles to that of Fig. 3 but showing said supplemental screw holes and screws as if centered in the plane of said section instead of with centers laterally offset as shown by Fig. 2.

Fig. 6 is a detail view, being a fragment of a section on the line 6—6 of Fig. 1, which line represents the oblique plane in which the conical points of the screws actually contact with the conical walls of the bushing holes.

Fig. 7 is a transverse section of another unit embodying the invention in its primary features, though not all subsidiary features.

Fig. 8 is a longitudinal section taken on the line 8—8 of Fig. 7, looking in the direction of the arrows.

Fig. 9 is a transverse section of another unit embodying the invention, the section being taken in the plane of centers of the bushing holes 10, but showing the screws and screw holes as if they were centered in the plane of said section, though their centers are offset longitudinally from said plane as appears from Fig. 10.

Fig. 10 is a longitudinal section taken on the line 10—10 of Fig. 9, looking in the direction of the arrows, but showing the screws as if centered in the plane of said section, though their centers are offset laterally therefrom as shown by Fig. 9.

Fig. 11 is a top plan view of the unit otherwise shown by Figs. 12 to 16.

Fig. 12 is a side elevation of the bushing utilized in said unit of Figs. 11 to 16.

Fig. 13 is a cross section of said unit taken on the line 13—13 of Fig. 11, looking in the direction of the arrows.

Fig. 14 is a central longitudinal section thereof taken on the line 14—14 of Fig. 13, looking in the direction of the arrows.

Fig. 15 is a horizontal section on the line 15—15 of Fig. 13, looking in the direction of the arrows.

Fig. 16 is a longitudinal section of the last mentioned unit with the bushing in its wedged position and the screws arranged in the supplemental screw holes for retracting or dewedging the bushing, the section being taken on a plane at right angles to that of Fig. 14.

Referring first to Figs. 1 to 6, a machine element to be mounted on a shaft is represented therein by a single groove V-belt sheave of small pitch diameter. In the form shown the sheave comprises a tubular hub 1 having thereon annular ribs 2 forming the side walls of the belt groove. The hub has a tapered bore in which is fitted a tapered longitudinally split contractible bushing 3, the split thereof being indicated at 4. The bushing is bored to fit the shaft to which the sheave is to be applied, such shaft being indicated in dotted lines and designated by the numeral 5 in Figs. 3 and 5. Preferably the shaft bore of the bushing is of such diameter that when the bushing in uncontracted state fits in the hub in close contact therewith the bushing will have a fairly close or moderately free slip fit on the shaft.

For forcing the bushing into gripping engagement with the hub and shaft, screws 7 are provided in the hub in engagement with the threads of threaded screw holes 6 extending through the hub wall transversely of the hub bore, said screws having conical inner ends 9, hereinafter referred to as the screw points, for coaction with the bushing in correspondingly conical bushing holes or recesses 10 eccentric to the screws. The screws are shown as headless and socketed in their outer ends for engagement by an Allen type wrench for operating the screws, one of the wrench sockets being shown at 8 in Fig. 1. The conical bushing holes may be formed by drilling holes of relatively small bore in the bushing and counterboring them to form frusto-conical recesses to receive the conical screw points.

There are shown in this instance two screws 7 arranged for engaging the bushing in diametrically opposite bushing holes 10; though the number and angular spacing of the screws and bushing holes will depend upon the magnitude and proportions of the unit in which the invention is embodied. In larger units than those represented in the drawings there may be three or more screws equally angularly spaced or otherwise appropriately angularly spaced, and correspondingly arranged bushing holes.

As shown by Figs. 1 and 3, the centers of the screws are offset forwardly from the transverse plane of centers of said bushing holes 10; and as shown by Figs. 1 and 2 the centers of the screws are also offset laterally from the longitudinal plane of centers of said bushing holes, both screws being centered at the same side of said longitudinal plane 3—3 of Fig. 2 as the longitudinal slot 4 which splits the bushing. Thus the screws coact with the bushing as shown in Fig. 6 in the diagonal plane represented by the line 6—6 of Fig. 1, with the effects, first, that the screws thus arranged do not oppose or interfere with the contraction of the bushing; and, second, that as the screws are tightened in alternation they force the bushing forwardly or in the direction for wedging with accompanying turning of the bushing, easing its forward movement and facilitated the wedging thereof. As the transverse components of the forces imposed by the screws on the bushing are directed toward the same side of the bushing, one screw as it is tightened turns or tends to turn the bushing in a clockwise direction, while the other screw as it is tightened turns or tends to turn the bushing in a counterclockwise direction. But neither screw prevents turning of the bushing by the other, for due to the relation of the screws to the bushing holes, and the forward movement of the bushing and accompanying contraction thereof as either screw is tightened, the bushing hole for the opposite screw is moved relative thereto in a manner to allow such turning. The tightening of either screw causes a clearance to be taken up by the opposite screw between its conical point and enclosed bushing hole surface against which it bears, or at least a lessening of the pressure of contact between said conical screw point and bushing surface, until the bushing becomes tightly wedged between the hub and shaft.

In the condition of the illustrative unit or structure represented in Figs. 1 to 3, the screws have been screwed inwardly sufficiently to bring the conical screw points 9 into engagement with the conical walls of the bushing holes 10 in the plane of and at the points indicated in Fig. 6, while the tapered bushing in uncontracted state or without material contraction thereof fits in the hub in close contact with its interior surface. Assuming the unit or structure in this condition to be on a shaft fitting the bore of the bushing without undue clearance, it will be apparent that the bushing can be effectually wedged between the hub and shaft by tightening the screws or forcibly screwing them inwardly until as a result of a tight interfitting of the bushing with the hub and shaft further operation of the screws is effectually resisted.

A wedging of the bushing so tightly between the hub and shaft as to obtain a press fit of the interfitted parts is desired for creating a dependable driving connection, as well as for securing the sheave to the shaft substantially concentrically therewith and erect thereon. The bushing and bore of the hub should therefore be of appropriate taper for effective wedging action. For such tight wedging as to obtain a press fit of the interfitted parts, the angle of taper of the bushing, i. e. the included angle between diametrically opposite longitudinal contour lines thereof, should ordinarily be not more than fourteen degrees. A taper of the bushing at an angle of from seven to twelve degrees is thought desirable. In the illustrative structure, the bushing is tapered at an angle of eight degrees, which of course is exemplary.

Assuming a close slip fit of the bushing in uncontracted state on the shaft, the longitudinal movement of the bushing relative to the shaft required for tight wedging is quite short. The distance of the screw centers from the transverse plane of centers of the bushing holes in Fig. 3 is substantially greater than such required longitudinal movement of the bushing. Hence, under the assumed condition, the bushing can be tightly wedged by forcibly screwing the screws inwardly to a position in which their centers are still located a substantial distance forwardly from said transverse plane of centers of the bushing holes 10. In short, the screws can be tightened sufficiently to effect tight wedging of the bushing without screwing them inwardly very far, under the condition assumed. If the clearance between the shaft and bushing in uncontracted state is sufficient for a moderately free and easy slit fit, or what may be termed a snug sliding fit of the bushing on the shaft, then for tight wedging of the bushing the screws would need to be screwed inwardly somewhat further to a position in which the screws more nearly approach a concentric relation to the bushing holes.

If the bushing in uncontracted state has a slip fit on the shaft, the illustrative unit in substantially or approximately the condition represented in Figs. 1 to 3 can be very easily installed by slipping it over the end of and along the shaft to desired position thereon and tightening the screws, thus effectually securing the sheave to the shaft by a press fit of the interfitted concentric parts. If the shaft bore of the bushing should be of substantially the same diameter as that of the shaft, or insufficiently larger than the shaft for a slip fit, nevertheless the unit can be installed by adjusting the screws outwardly and adjusting the axial relationship of the hub and bushing to increase the clearance between them, then placing the unit on the shaft by forcing the bushing thereon while it is loose in the sheave hub, then forcing the hub relative to the bushing to a position permitting entry of the conical screw points within the outer ends of the bushing holes, and screwing up and tightening the screws.

To permit easy and quick demounting of the unit, the sheave hub is provided with supplemental screw holes 12 in which the screws 7, after withdrawal thereof from the screw holes 6, can be operated for dewedging the bushing or effecting release thereof from gripping engagement with the hub and shaft, there being associated with an eccentric to said screw holes 12 the supplemental bushing holes 13 in which the conical screw points 9 can coact with the bushing for forcing it from the position to which it has been forced for wedging it. In Fig. 5, which is a longitudinal section taken on a plane at right angles to that of Fig. 3, the structure is represented in the condition in which the bushing has been forced to position for wedging it, and with the screws rearranged in said screw holes 12 for retracting the bushing from such position. The screw holes 12 are so located that in the condition of the structure represented in Fig. 5 the centers of said screw holes are offset rearwardly from the transverse plane of centers of the bushing holes 13. The centers of the screw holes 12 are also offset laterally from and to the same side of the longitudinal plane of centers of said bushing holes 13, as shown by Fig. 2, the arrangement being such that the screws when operated in the screw holes 12 coact with the bushing in the reverse manner to that in which they coact therewith when operated in the screw holes 6. That is to say, the screws 7 as they are tightened in the screw holes 12 force the bushing rearwardly, without opposing expansion of the bushing from its contracted state, one screw as it is tightened turning the bushing in one direction of rotation, and the other as it is tightened turning it in the opposite direction of rotation, thus facilitating the dewedging. It will be observed from Fig. 2 that the centers of the screw holes 12 are offset from the longitudinal plane of centers of the bushing holes 13 at the side thereof opposite the bushing split, so that as the screws are operated in the screw holes 12 the forces thereby imposed on the bushing transversely thereof are directed toward the unsplit side of the bushing and thus assist rather than obstruct expansion of the bushing and its release from the shaft.

Reference will now be made to the somewhat modified constructions embodied in the units shown in the remaining figures of the drawings.

Figs. 7 and 8 show a structure differing from that first described in omitting the lateral offsetting of the screw holes relative to the corresponding bushing holes, or in other words having the screws and screw holes in which they are operated centered forwardly from the centers of the corresponding bushing holes but in the same longitudinal planes therewith. As this structure is otherwise identical to the other, the parts thereof are designated in Figs. 7 and 8 by the same reference numerals as the corresponding parts in Figs. 1 to 6, except that in Figs. 7 and 8 the screw holes in which the screws are operated for wedging the bushing are designated by the symbol $6^a$, while the screw holes in which the screws are operated for the dewedging function are designated by the symbol $12^a$. As represented in said Figs. 7 and 8, the screws are arranged in the screw holes $6^a$ in position to be tightened for wedging the bushing between the hub and shaft. In this instance, the screws oppose contraction of the bushing; or, to put the matter differently, the contraction of the bushing as the screws are tightened imposes an additional resistance to the further tightening of the screws. Nevertheless the structure is practicable, especially if the screws engage loosely in the screw holes by provision of appropriate clearance between the interengaging threads of the screws and screw holes. In this connection, it is to be remembered that as either screw is tightened the stress on the other is relieved, so that the other becomes looser; and further, that even if the clearance between the interengaging threads of the screws and screw holes is insufficient to compensate entirely for the tendency of the screws to resist contraction of the bushing, the conical screw points 9 bearing against only the fore portions of the conical walls of the bushing holes 10 can be jammed so forcibly thereagainst as to impress themselves in the said walls and establish their own radius in the portions of said walls in which they engage.

Figs. 9 and 10 represent a structure differing from that first described in having the screw holes $6^b$ in which the screws are operated for wedging the bushing arranged with their centers offset at opposite sides of the longitudinal plane of centers of the associated bushing holes 10, and the screw holes 12ᵇ in which the screws are operated for dewedging correspondingly arranged with their centers at opposite sides of the longitudinal plane of centers of the associated bushing holes 13; the construction being otherwise identical to the first and the parts thereof other than the screw holes 6ᵇ and 12ᵇ being designated in said Figs. 9 and 10 by the same reference numerals as the corresponding parts in Figs. 1 to 6. In said Figs. 9 and 10, the screws are shown arranged in the screw holes 6ᵇ in a position to be tightened for wedging the bushing between the hub and shaft. As the screws are tightened in alternation they force the bushing forwardly while turning it, both screws turning the bushing in the same direction of rotation. Thus the bushing is forced forwardly with a screw-like movement. While it may seem, looking at Fig. 9, that the lower one of the screws opposes contraction of the bushing, this is not of serious moment, for as the upper screw is being tightened the lower one bears less tightly in its bushing hole, and as the lower screw is being tightened the bushing can contract by movement from the lower screw around the shaft in a clockwise direction to and past the upper screw. When the screws are operated in the screw holes 12ᵇ for the dewedging function, they force the bushing rearwardly while turning it in the opposite direction to that in which it was turned as it was forced forwardly. Thus the bushing is retracted by an unscrewing-like movement.

As shown in Figs. 11 to 16, in an embodiment of the invention without the subsidiary features by which to turn the bushing as it is forced longitudinally, the recessed portions of the bushing in which the conical screw points engage, instead of being formed by conical holes in the bushing, may be provided by an annular groove in the bushing. The unit or structure shown in said Figs. 11 to 16 comprises a small two grooved V-belt sheave to be applied to the shaft 105. The sheave hub 101 has a tapered bore in which is fitted a tapered split contractible bushing 103 formed with a peripheral V-shaped groove 110 to receive the conical points of the screws 107. The screw holes 106 for said screws have their centers offset forwardly from the transverse central plane of the V-shaped bushing groove, so that the conical points of the screws bear against the forward side of said groove for forcing the bushing into gripping engagement with the hub and shaft. The supplemental screw holes 112 in the hub are so located that, when the bushing is wedged between the shaft and hub as in Fig. 12, the centers of said screw holes 112 are offset rearwardly from said plane, so that the conical points of the screws when operated in the screw holes 112 will bear against the rear side of said V-shaped groove for dewedging or retracting the bushing from such gripping engagement. The structure of Figs. 11 to 16 exemplifies a very simple and desirable form of embodiment of the invention, more especially for units in which the bushings are bored to fit shafts of smaller diameters than the ordinarily accepted maximum diameters for the particular units.

While in a well designed structure embodying the invention the connection established between the hub and shaft by the tight wedging of the bushing therebetween may be depended upon for a driving connection in a great many cases, and under the majority of service conditions for which V-belt sheaves and sprockets of small and moderate pitch diameters are commonly used, yet the invention does not necessarily exclude the use of keying means if desired, as may often be for no better reason than to satisfy those very conservative mechanics who think that in a structure of the class to which the invention pertains the bushing should invariably be keyed to its shaft. Accordingly there is shown in the hub of the structure of Figs. 11 to 16 an internal longitudinal keyway or groove 114 for slidably engaging with a conventional shaft key if used. Obviously it is practically immaterial to the structure of Figs. 11 to 16 whether or not such shaft key be used, so far as concerns mounting and demounting of the structure and the operation of the screws for wedging and dewedging the bushing. If a shaft key is used, then in mounting the structure it would be slipped endwise on the shaft in such angular relation thereto that the key will enter the keyway, as is well understood. Ordinarily there would be no particular advantage in keying the bushing to the hub, though conventional keying means could be employed for this purpose, of the type permitting relative longitudinal movement of the keyed parts but preventing or limiting relative rotative movement thereof.

Keying to the shaft of the bushing 3 of either of the units or structures shown in Figs. 1 to 10, though considered unnecessary and undesirable, is nevertheless in contemplation in case of any supposed necessity or to satisfy users insisting upon the use of a shaft key. If the bushing 3 of the structure of Figs. 1 to 6 were keyed to the shaft in similar manner to that above indicated with reference to Figs. 11 to 16, it would prevent turning of the bushing by the tightening of the screws except to the extent allowed by clearance between the key and side walls of the keyway. Nevertheless a shaft key may be used in the structure of Figs. 1 to 6, and also in the structure of Figs. 7 and 8. Probably it would be impracticable to use a shaft key in the structure of Figs. 9 and 10 unless with sufficient clearance between the sides of the key and keyway to permit the action described with reference to the last mentioned structure.

As will have been observed from the drawings, the invention permits the use of a flangeless bushing in a simple taper-bored hub, obviating the need of any extension of and attachment to either the hub or bushing for operative connection with screws, and having the screws arranged to take up little or no extra room; wherefore the invention is applicable to small as well as larger sheaves, sprockets and other machine elements and to units having the hub bushings bored to fit shafts of large diameters relative to the pitch diameters of such sheaves, sprockets or other machine elements. A unit embodying the invention may therefore be of substantially less metal content and weight than one of comparable magnitude and proportions for use on a shaft of like diameter and having a bushing flange for anchorage of screws extending through the hub parallel with the shaft, or otherwise employing longitudinally arranged screws connected to or coacting with a flange or the like on an extension of either the hub or bushing.

The sheave shown in Figs. 1 to 5 is a "dual duty" sheave in the sense that its belt groove is designed to permit use with the sheave of a V-belt of either of two standard commercial sizes or cross-sections, the smaller one to engage in the belt groove nearer the hub and the other to engage in the belt groove nearer the perimeter of the sheave. When used with the V-belt of smaller size, the pitch diameter of the sheave is the minimum for that size of V-belt, according to good manufacturing practice. On the other hand, the bushing 3 is bored to fit a shaft of the maximum diameter on which a sheave of such small pitch diameter should be used, according to such practice. The longitudinal and radial dimensions of the hub and bushing are no greater than they would ordinarily be anyhow for strength and stability of the mounting. It will be seen therefore that the invention, especially in the form utilizing conically pointed screws coacting with the bushing in conical bushing holes eccentric to the screws, substantially minimizes the essential dimensions of the hub and bushing for accommodation of the screws and their operative connections or accessories, i. e. the screw holes and bushing holes.

In the form of the invention exemplified in Figs. 11 to 16, the radial thickness of the bushing wall must be somewhat greater than in the case just discussed; however this form substantially minimizes the other dimensional requirements for accommodation of the screws and permits use of a bushing having a wall not a very great deal thicker than that of the bushing 3 of the structure first described. The form of the invention exemplified in Figs. 11 to 16 may therefore be considered as nearly minimizing essential dimensions of the hub and bushing for accommodation of the screws and their accessories. Moreover the design of the structure shown in Figs. 11 to 16 might be modified to reduce the radial thickness of the bushing wall, as by employing screws with somewhat shorter and blunter conical points and modifying the cross-sectional form of the groove 110 so that its sides, instead of extending from a vertex, would diverge from a narrow ground or bottom located nearer the outer perimeter of the bushing than the vertex of the V-shaped bushing groove shown in said figures.

While screws having conical points such as are exemplified in the drawings are preferred, it is contemplated that in some embodiments of the invention screws may be used having hemispherical or other suitably rounded points for coaction with the inclined bushing surfaces provided in the recessed portions of the bushing in which the screw points enter.

It will be understood that any of the illustrative structures shown in the drawings may be variously modified in specific design, proportions and details to said various different requirements and conditions.

The term "hub" as used on the following claims may denote the hub of a machine element or device to be mounted on a shaft or such element as a whole having a tapered hub bore.

The term "recessed portions" is used with reference to the recessed portions of the bushing in which the screws coact therewith, whether provided by separate angularly spaced bushing holes or by an annular groove in the bushing.

I claim:

1. A shaft-mountable unit comprising a hub having a tapered bore and two groups of transversely disposed screw-holes extending through the hub wall, a tapered split contractible bushing fitting in said hub, and screws for operation in either of said groups of holes, said bushing having inclined surfaces with which the screws when operated in one group of holes are coactive for forcing the bushing forwardly to wedge it between the hub and shaft, and inclined bushing surfaces with which the screws when operated in the other group of holes are coactive for dewedging the bushing, the respective inclined surfaces being in recessed portions of the bushing and opposite the respective screw-holes and at acute angles to the axes thereof, those of said surfaces associated with said one group of holes being arranged for engagement by the screws therein forwardly of the screw axes, and those of said surfaces associated with said other group of holes being arranged for engagement by the screws therein rearwardly of the screw axes.

2. A shaft-mountable unit comprising, in combination, a hub having a tapered bore, a tapered split contractible bushing fitted therein, transversely disposed screws threaded in the hub, and conical recesses in the bushing into which the screws can extend, the axes of the screws being parallel with but offset forwardly relative to the axes of said conical recesses so that the screws bear against the conical walls of said recesses at forward portions thereof, whereby tightening of the screws will force the bushing forwardly to wedge it between the hub and a shaft.

3. A shaft-mountable unit comprising, in combination, a hub having a tapered bore, a tapered split contractible bushing fitted therein, transversely disposed screws threaded in the hub, and conical recesses in the bushing into which the screws can extend, the axes of the screws being parallel with but offset forwardly relative to the axes of said conical recesses so that the screws bear against the conical walls of said recesses at forward portions thereof, whereby tightening of the screws will force the bushing forwardly to wedge it between the hub and a shaft, there being additional threaded screw holes in the hub and associated conical recesses in the bushing in such relation that screws operated in such additional holes will bear against the conical walls of such associated recesses at rearward portions thereof to dewedge the bushing.

4. A shaft-mountable unit comprising, in combination, a hub having a tapered bore, a tapered split contractible bushing fitted therein, transversely disposed screws threaded in the hub, and conical recesses in the bushing into which the screws can extend, the axes of said screws being parallel with but offset both forwardly and laterally relative to the axes of said conical recesses so that the screws bear against the conical walls of said recesses at such parts thereof that as the screws are tightened they force the bushing forwardly while turning or tending to turn it.

5. A shaft-mountable unit comprising, in combination, a hub having a tapered bore, a tapered split contractible bushing fitted therein, transversely disposed screws threaded in the hub, and conical recesses in the bushing into which the screws can extend, the axes of said screws being parallel with but offset both forwardly and laterally relative to the axes of said conical recesses so that the screws bear against the conical walls of said recesses at such parts thereof that as the screws are tightened they force the bushing forwardly while turning or tending to turn it, there being additional threaded screw holes in the hub and associated conical recesses in the bushing in such relation that screws operated in such additional holes will bear against the conical walls of such associated recesses at such parts thereof as to retract the bushing with accompanying turning movement or tendency.

6. A unit according to claim 4 wherein there are two such screws and the conical recesses in the bushing are diametrically opposite and the centers of the screws are offset from the longitudinal plane of centers of said conical recesses toward the side of the bushing having the slot by which it is split.

7. A unit according to claim 4 wherein there are two such screws and associated conical bushing recesses and the centers of the screws are so arranged relative to the centers of said recesses that the screws as they are tightened in alternation turn or tend to turn the bushing in opposite directions.

8. A unit according to claim 4 wherein the centers of the screws are so arranged relative to the centers of said conical bushing recesses that all screws as they are tightened turn or tend to turn the bushing in the same direction of rotation.

9. A unit according to claim 5 wherein the screws when operated in engagement with the bushing in the first mentioned conical recesses are so centered that they all tend to turn the bushing in the same direction of rotation, and when operated in said additional screw holes are so centered that they tend to turn the bushing in the opposite direction of rotation.

10. A shaft-mountable unit comprising, in combination, a hub having a tapered bore, a tapered split contractible bushing fitted therein, said bushing having an annular groove with an inclined forward wall, and transversely disposed screws threaded in the hub and arranged to be extended into said groove and to bear against said forward wall thereof for forcing the bushing forwardly to wedge it between the hub and a shaft.

11. A shaft-mountable unit comprising, in combination, a hub having a tapered bore, a tapered split contractible bushing fitted therein, said bushing having an annular groove with diverging inclined sides, transversely disposed screws threaded in the hub and arranged to be extended into said groove and to bear against the forward wall of said groove for forcing the bushing forwardly to wedge it between the hub and a shaft, and additional screw holes in the hub so arranged that the screws can be operated therein against the rear wall of said groove for dewedging the bushing.

12. An element for a unit of the class described comprising a tapered split contractible bushing having in its perimeter a plurality of conical recesses centered in a transverse plane and angularly spaced more than ninety degrees apart and additional such recesses arranged in alternation with said first mentioned recesses, the whole number of recesses being in substantially an annular series.

13. An element for a unit of the class described comprising a tapered split contractible bushing having in its perimeter a pair of conical recesses centered in a transverse plane and arranged in opposite sides of the bushing and an additional pair of such recesses arranged in alternation with those first mentioned.

14. An element for a unit of the class described comprising a tapered split contractible bushing having in its perimeter an annular groove with diverging inclined side walls.

15. A fastening means of the character described for securing a wheel or the like to a shaft, including a wedge constructed and arranged between the shaft and the shaft bore in the hub of the wheel; two cam surfaces on the wedge one inclined oppositely with respect to the other; a screw threadedly engaged in the wheel hub and cooperative with one cam surface to shift the wedge into binding relation to the shaft and the wheel bore; and a second screw similarly engaged in the wheel hub and adapted by cooperation with the other cam surface to reversely shift the wedge in preparation for the removal of the wheel.

DAVID FIRTH.

REFERENCES CITED

The following references are of record in the file of this patent:

UNITED STATES PATENTS

| Number | Name | Date |
| --- | --- | --- |
| 506,673 | Crosby | Oct. 17, 1893 |
| 1,661,226 | Martin | Mar. 6, 1928 |
| 2,098,709 | Murden et al. | Nov. 9, 1937 |
| 2,217,656 | Boehme | Oct. 15, 1940 |

FOREIGN PATENTS

| Number | Country | Date |
| --- | --- | --- |
| 143,908 | Austria | Dec. 10, 1935 |